Nov. 8, 1927.
M. FINSTONE
1,648,544
SWIVEL PEN SUPPORT FOR DESK SETS
Filed Dec. 24, 1926
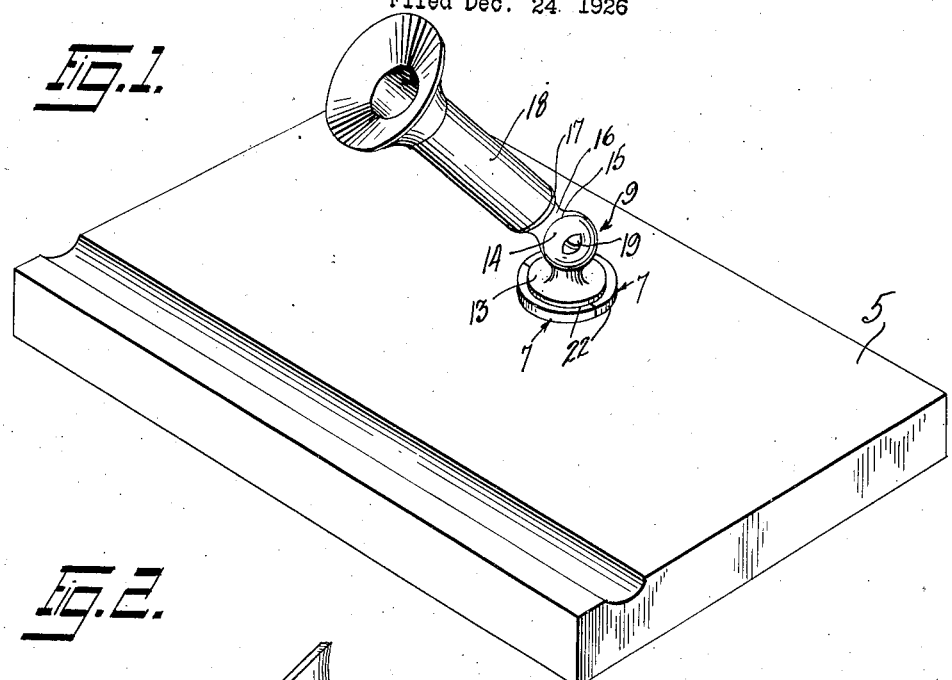
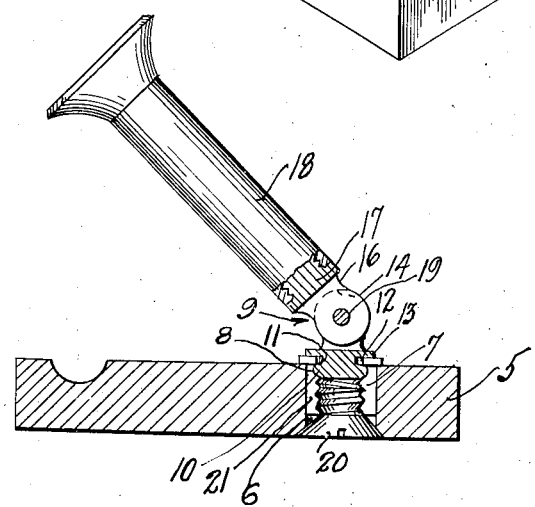
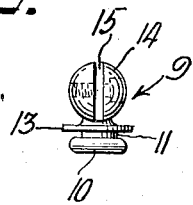
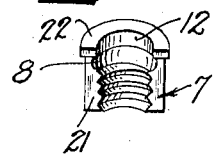

Patented Nov. 8, 1927.

1,648,544

UNITED STATES PATENT OFFICE.

MARX FINSTONE, OF NEW YORK, N. Y.

SWIVEL PEN SUPPORT FOR DESK SETS.

Application filed December 24, 1926. Serial No. 156,773.

This invention relates to improvements in desk set pen supports, and has for one of its chief objects, the provision of a swiveled pen support adapted for universal adjustment or movement in the desk set base.

Another object of the invention is to provide a swiveled pen support for a desk set of simple, substantial and inexpensive construction.
Other objects and advantages of my invention will become more apparent as the specification proceeds.

Referring to the drawings forming a part of this specification, Figure 1 is a perspective view of one embodiment of my invention, Figure 2 is an end view of same partly in section and Figures 3 and 4 are detail views of the swivel forming members.

Referring to the drawings in detail 5 indicates a base made of any suitable material, such as hard rubber, onyx, celluloid or the like. The base 5 is provided with a hole or opening 6 which houses a two part bushing 7—7 having an annular recess 8 near the top end thereof, in which there is rotatably mounted a post 9 provided with a lower disk 10 loosely fitting in the said recess 8. A reduced or neck portion 11 extends from the disk 10 through an opening 12 formed by the two sections of the bushing 7—7 and terminating in an upper portion having a flange 13 and a spherical head 14 in which there is cut a slot 15 to accommodate an ear 16 projecting from a threaded stud 17 upon which there is screw threadedly supported a pen holding member 18. The stud 17 is hingedly mounted in the slot 15 on a screw 19 threaded into the head 14. The entire construction forms a swivel adapted for substantially universal movement in the base 5 in which it is maintained by a screw 20 threaded into the threaded depending portions 21 of the bushing 7—7. The bushing 7—7 terminates at its upper end in a head or flange 22 which supports same on the base 5.

To assemble the device, the stud or post 9 is placed between the two halves of the bushing 7—7 which is inserted into the opening 6 in the base 5 and the screw 20 is then threaded into the bushing and tightened to hold same in place. The depending ear 16 is then inserted into the slot 15 and screw 19 passed through the ear and threaded into the head 14 and the entire device is ready for use.

From the foregoing it will be seen that I have produced a desk set provided with a swivelled pen support adapted to be rotated in a circular direction and in an up and down or angular direction in any position that the post 14 may assume, thereby giving the device a substantially universal adjustment. It will also be seen that the entire construction forms a simple, inexpensive and efficient device for the purpose specified.

Having described my invention what I claim as new is:

1. In a desk set, a base having an opening, a bushing comprising a plurality of sections in the opening, each of the sections being provided with a recess to form an annular groove, and a post having a depending member rotatably fitting into the recesses and a pen supporting member hingedly mounted in the post.

2. In a desk set, a base having an opening, a bushing comprising a plurality of sections in the opening, each of the sections being provided with a recess to form an annular groove, a post having a depending member rotatably fitting into the recesses and a pen supporting member hingedly mounted in the post, and means for securing the bushing to the base.

3. In a device of the nature described, a base, a pen holding member, and a connector between the pen holding member and the base, comprising a multiple part bushing provided with an annular groove and a stud rotatably mounted at one end thereof in the groove and hingedly supporting the pen holder at the opposite end thereof, the said connector forming means for rotating the pen holding member through a complete circle in a horizontal plane and through an arc of substantially a half circle in a vertical plane.

4. A desk set, comprising a base provided with an opening, a multiple part bushing secured in the base opening and provided with an annular groove, a flange on the bushing resting on the base, a stud provided with a disk like portion rotatably supported in the groove, a flange spaced from the disk-like portion resting on the bushing flange, a head on the stud provided with a slot, and a pen supporting member hingedly mounted in the slot.

In testimony whereof I hereunto affix my signature.

MARX FINSTONE.